Robert M. Zoot,
INVENTOR.
BY.
ATTORNEY.

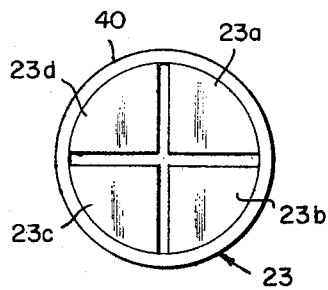
Fig. 4.
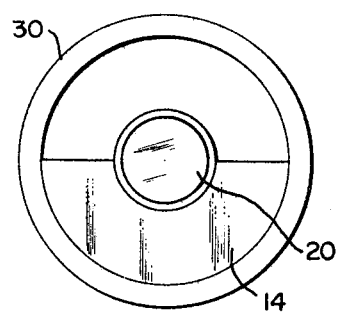
Fig. 2.
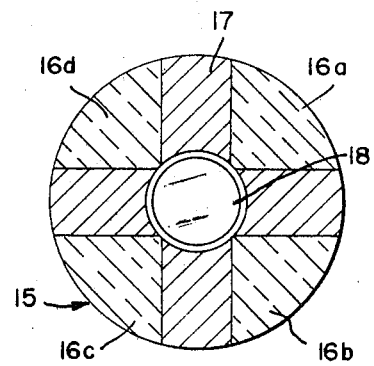
Fig. 3.
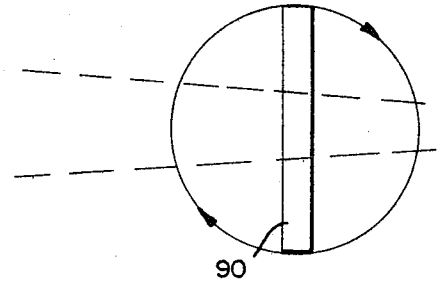
Fig. 9.
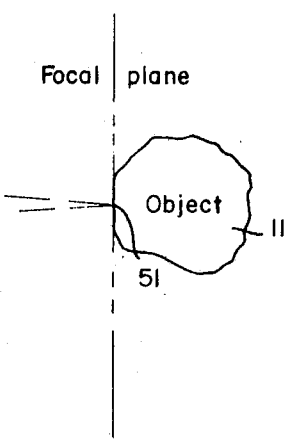
Fig. 10.
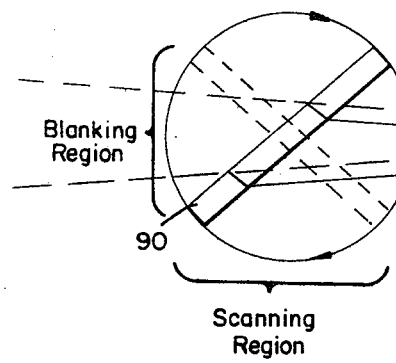
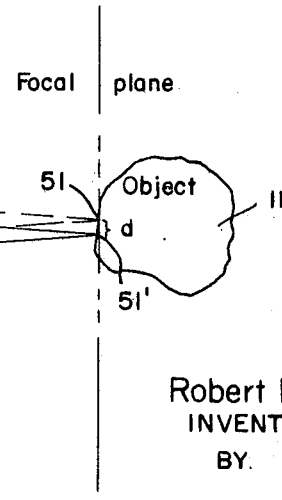
Robert M. Zoot,
INVENTOR.
BY.
ATTORNEY.

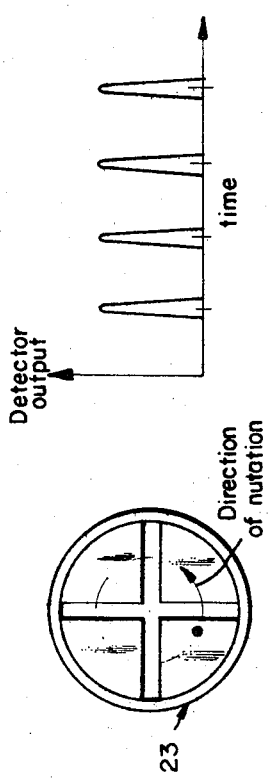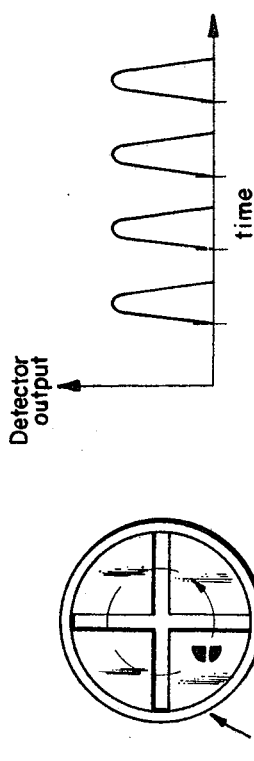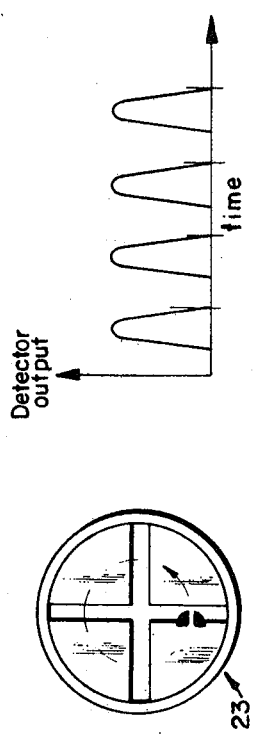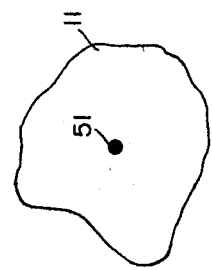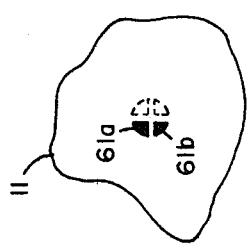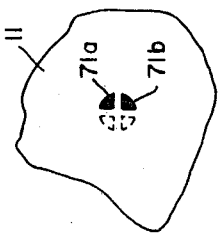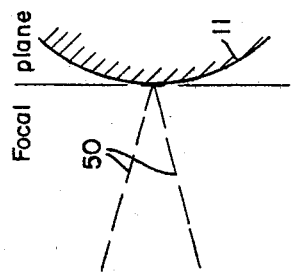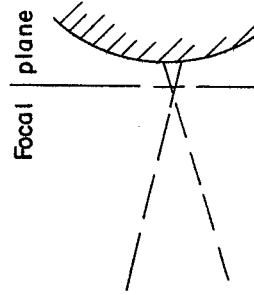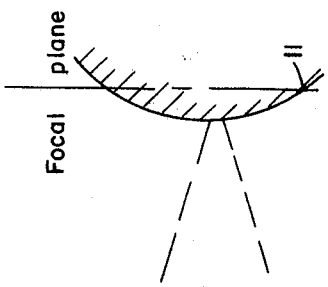

United States Patent Office 3,520,607
Patented July 14, 1970

3,520,607
PHASE SENSING LASER CONTOUR MAPPER
Robert M. Zoot, Thousand Oaks, Calif., assignor to Hughes Aircraft Company, Culver City, Calif., a corporation of Delaware
Filed Oct. 17, 1967, Ser. No. 675,964
Int. Cl. G01b 11/00; G01c 3/08
U.S. Cl. 356—5
10 Claims

ABSTRACT OF THE DISCLOSURE

A noncontacting distance gauge and contour mapping apparatus utilizing a high intensity light source. A single light beam from the source is split into a plurality of secondary beams by an appropriate transmitting reticle. A rotating chopper sequentially interrupts the secondary beams. The beams are then focused upon the object, the distance to which, or contours of which, are being measured. At object-focal point coincidence the beams merge to form a single point image. When the surface of the object does not coincide with the focal point, multiple images are produced. Light reflected from the object is swept over a receiving reticle disposed in the optical path in front of an optical detector in synchronism with the rotating chopper. The changes in phase of the detector output is indicative of the deviation in distance from object-focal plane coincidence. A servomechanism and optical beam sweeping means can be used in conjunction with drive mechanisms to scan the light beams over the surface of the object to facilitate automatic contour measurements.

FIELD OF THE INVENTION

This invention relates to electro-optic measuring methods and apparatus and more specifically to methods and apparatus for quickly and accurately determining distances and contours.

DESCRIPTION OF THE PRIOR ART

In the past, countless methods and devices have been employed to measure relatively short distances. Depending upon the particular requirements of the job at hand, direct measurements have been made with rulers, calipers, micrometers and gauges of innumerable types. Frequently, it is advantageous or necessary to measure the distance between a reference point and an object without touching or disturbing the object. The requirement for noncontacting measurement may arise because of the nature of the object or because of its position. Oftentimes, in such instances, optical techniques, including those which utilize precision instruments and associated hardware, have been employed. In general, such techniques require highly skilled operators to perform manual adjustments and set-up operations. Depending upon the application, these operations can comprise positioning, aligning, leveling and establishing reference targets. It is obvious, therefore, that such measuring techniques are both complex and time-consuming.

Accordingly, it is one object of the present invention to simplify optical measuring techniques.

It is an other object of the present invention to provide improved noncontacting apparatus for accurately measuring the distance between a reference point and an object.

One application of precision measurements in modern industry is in conjunction with automatic machining and tooling processes. In these applications, it is frequently advantageous to construct a model of an article of manufacture or structure from which patterns, dies or drawings can be made. It is common practice in these processes to utilize a master model or template, together with automatic machine tools, to form large quantities of similarly finished articles.

In manufacturing or construction practices which utilize this technique, the contours of the model must be translated into a form by which the mass-produced articles may be manufactured. This process may involve time-consuming hand measurements or the construction of templates at successive cross-sections of the object. It is therefore advantageous to utilize contour or profile mapping means which enable the contours of the object to be determined quickly, precisely and preferably automatically. It is also advantageous if the contour mapper is capable of yielding an output in the form of digital or analog signals which can be utilied to program automatic machine tools for die forming or machining operations.

Recently, and as a consequence of advances in laser technology, automatic contour mapping systems have been proposed which offer greater accuracy than heretofore available. In applicant's copending application, Ser. No. 616,996, filed Jan. 3, 1967, now U.S. Pat. No. 3,481,672 issued Dec. 2, 1969 there is disclosed an improved electro-optic distance gauge and contour mapping apparatus which utilizes a high intensity light source such as a continuous wave laser. According to the invention of applicant's copending application the light beam is transmitted through a beam splitting reticle in the transmitting optical system. When the beam is focused on the object, the distance to which is to be determined, an image in the form of a single spot is formed. As the distance between the light source and the object increases or decreases so that the image is out of focus, the image produced on the object separates into a plurality of spots. By utilizing a receiving optical system which includes a rotating nutating plate and a receiving reticle in front of an optical detector, a fluctuating detector output signal is obtained. The harmonic content of the detector output signal provides a measure of the amount by which the object is out of focus. The system of the copending application thus operates on the frequency modulation principle.

The contour mapping system of the above-mentioned copending application is superior to other prior art techniques and is adequate for most applications. The system of the present invention, although slightly more complex than that of the copending application, is more flexible and is adaptable to a wider range of industrial applications.

SUMMARY OF THE INVENTION

In keeping with the principles of the present invention, electro-optic distance measurement and contour mapping is achieved in a manner similar to the F.M. technique mentioned above. That is, several secondary light beams derived from a single source of high intensity light such as a continuous wave laser are focused onto the surface of the object under measurement. Unlike the previous devices, however, a rotating chopper is included in the transmitting optical system to periodically interrupt portions of the transmitted secondary light beams. The beams thus interrupted are directed through a transmitting objective lens of known focal length toward the object. When the surface of the object is coincident with the focal plane of the transmitting optical system, point illumination is produced. As the distance between the focal plane and object increases, the region of object illumination becomes larger and separates into a plurality of regions each due to one of the separated light beams. The light reflected from the object is focused onto an optical detector by a receiving optical system. The receiving optical system utilizes a nutating plate which is rotated in synchronism with a chopper. The nutating plate causes the received image to sweep across a receiving reticle disposed in the light path in front of the optical detector, the output of which thus comprises a series of pulses.

A phase comparison circuit detects phase changes in the detector output pulses as the object-to-focal plane distance changes. If the point of object-focal plane coincidence is utilized as a zero reference, an increase in distance results in a phase shift in one direction and a decrease in distance results in a phase shift in the other direction. The amount of the phase shift of the detector output pulses is indicative of the change in distance. As in the invention of the above-mentioned copending application, servomechanisms can be employed to provide automatic $xyz$ motion for contour mapping. In addition, a simple mechanical scheme is described for providing a limited sawtooth scan which is useful in contour mapping operations.

BRIEF DESCRIPTION OF THE DRAWINGS

In order that the invention may be clearly understood and readily carried into effect it will now be described with reference, by way of example, to the accompanying drawings, in which:

FIG. 2 is a front elevation view of the composite chopper-nutating plate utilized in the embodiment of FIG. 1;

FIG. 3 is a cross-sectional view of the composite transmitting lens-reticle structure utilized in the embodiment of FIG. 1;

FIG. 4 is a front elevation view of the receiving reticle structure utilized in the embodiment of FIG. 1;

FIGS. 5A, 5B, 5C and 5D are sequence views illustrating the operation of the embodiment of FIG. 1 for an object having a surface which is coincident with the focal plane of the transmitting optic system;

FIGS. 6A, 6B, 6C and 6D are sequence views illustrating the operation of the embodiment of FIG. 1 for an object having a surface which is displaced behind the focal plane of the transmitting optic system;

FIGS. 7A, 7B, 7C and 7D are sequence views illustrating the operation of the embodiment of FIG. 1 for an object having a surface which is displaced in front of the focal plane of the transmitting optical system;

FIGS. 9 and 10 are partial views of the embodiment of FIG. 1 illustrating a modification thereof to facilitate beam scanning operation.

DESCRIPTION OF THE PREFERRED EMBODIMENTS

Figure 1:
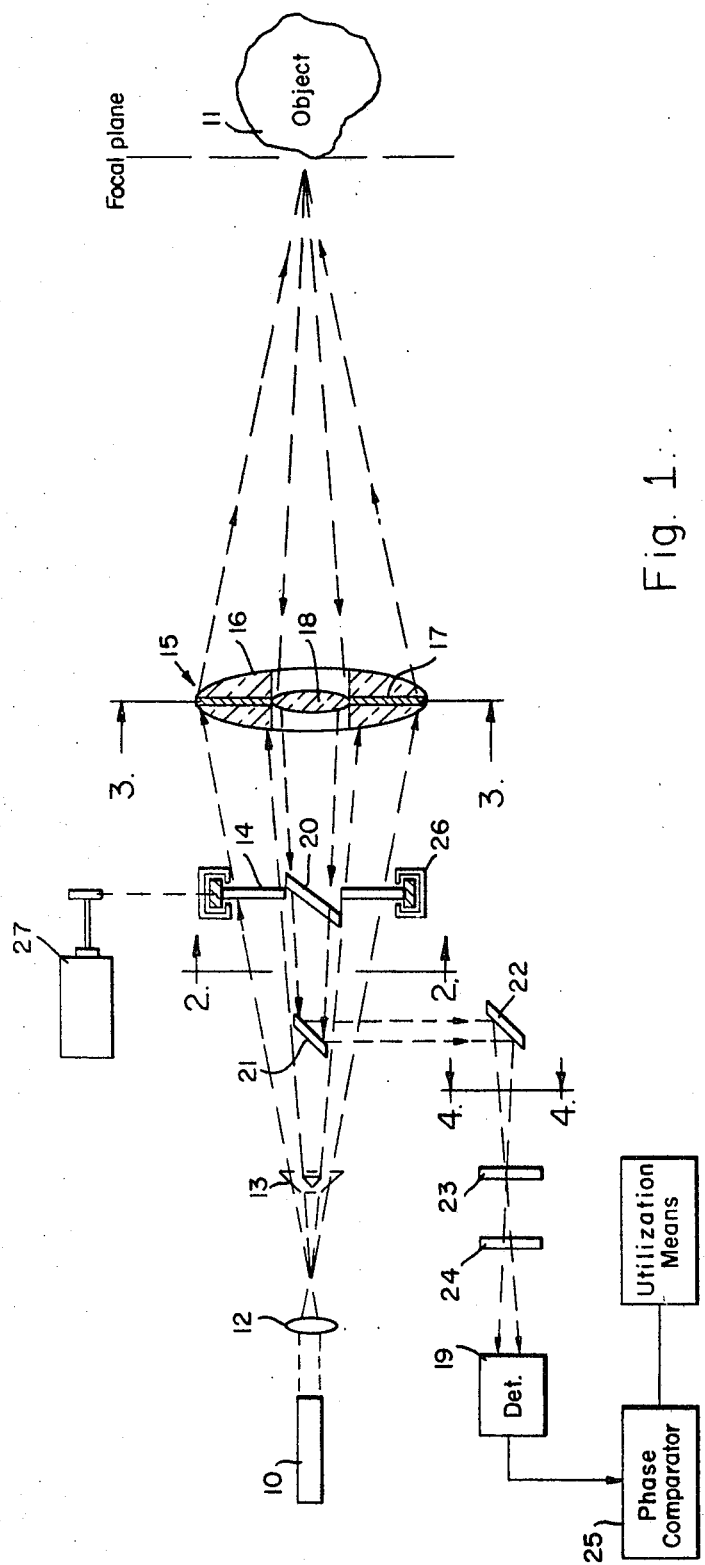
FIG. 1 is a view, partially in schematic and partially in cross-section, of a preferred embodiment of the present invention.

Referring more specifically to the drawings, FIG. 1 is a view, partially in schematic and partially in cross-section, of a preferred embodiment of the present invention. In FIG. 1 there is shown a light source 10 which is capable of emitting a continuous beam of high intensity, highly directional, substantially monochromatic light. As used herein, the term "light" is understood to include not only those portions of the electromagnetic wave spectrum lying in the visible region but also those in the infrared and ultraviolet regions as well. By way of example, light source 10 can comprise a laser oscillator of the continuous wave type. An object 11, the distance to which is to be measured, is located away from light source 10.

In the optical path between light source 10 and object 11 there are disposed a primary lens 12, ring-forming device 13, chopper 14 and composite lens-reticle structure 15. The composite lens-reticle structure 15, in turn, comprises an annular transmitting objective lens 16, a transmitting reticle 17 and a receiving objective lens 18 which is located within the central region of annular transmitting lens 16. Although transmitting reticle 17 is shown as a relatively thin member sandwiched between two halves of the transmitting objective lens 16, other arrangements are possible. For example, if a more economical structure is desired the reticle can be simply painted upon one of the surfaces of the transmitting objective lens 16.

An optical detector 19 which is capable of providing an electrical output signal, the magnitude of which varies in response to the intensity of the light incident upon it, is also incorporated in the embodiment of FIG. 1. In the optical path between object 11 and detector 19 is the receiving objective lens 18, a nutating plate 20, reflecting members 21 and 22, a receiving reticle 23 and an optical filter 24. The output of optical detector 19 is, in turn, coupled to a phase comparator circuit 25 which provides an output signal indicative of changes in the phase of the pulsed output of detector 19.

In FIG. 1 the chopper 14 and nutating plate 20 are shown combined in a single composite structure for synchronous rotation. Nutating plate 20 and chopper 14 are, in turn, supported in an air bearing indicated generally in FIG. 1 by housing 26. The motive force for rotating the composite chopper-nutating plate structure can be provided by any suitable means such as a low-torque motor 27. It is possible, of course, to utilize independent chopper and nutating plate structures adapted for synchronous rotation by mechanical means such as gears.

In operation, a beam of high-intensity, substantially monochromatic light produced by light source 10 is directed through primary lens 12. The light beam indicated by the dashed arrows diverges after passing through lens 12 and is directed toward ring-forming device 13. Ring-forming device 13, in its simplest form, comprises one conicle and one frustro-conicle reflecting surface separated by a transparent dielectric material such as air, and coaxially arranged as shown in FIG. 1. Ring-forming device 13 serves to convert the solid cone of light emerging from primary lens 12 into a hollow cone of light directed toward composite lens reticle structure 15. If desired, ring-forming device 13 can be omitted from the embodiment of FIG. 1 with a relatively small decrease in light intensity to object 11.

Before the light beam from ring-forming device 13 reaches composite lens-reticle 15, however, it is intercepted by rotating chopper 14. Chopper 14, shown in greater detail in the front elevation view of FIG. 2 is of semicircular geometry, thus only one-half of the cone of light emerging from ring-forming member 13 is transmitted to composite lens-reticle structure 15 at any given instant.

The light beam then passes through the composite transmitting lens-reticle structure 15. This composite structure 15, shown in greater detail in the cross-sectional view of FIG. 3, allows four somewhat pie-shaped beams of light to be directed toward object 11. In the absence of chopper 14, all four of these secondary beams would reach the surface of object 11 simultaneously. Due to the rotating chopper, the secondary beams are sequentially interrupted so that at any given instant a maximum of only two complete secondary beams are transmitted. It will become more apparent from the description to follow that during much of the rotational cycle of chopper 14 one complete and two partial secondary beams will be transmitted to object 11. During these portions of the cycle, however, it will be seen that the optical detector 19 is masked by receiving reticle 23.

As mentioned hereinabove, the transmitted light which in split by reticle 15 into four secondary beams is focused on object 11. In the embodiment of FIG. 1, the region of object 11 on which the transmitted light beam is focused is shown to coincide with the focal point of the primary lens-transmitting objective lens combination. When object 11 is so situated, the transmitted light beam appears as a spot on the surface of object 11. The diameter of the spot is extremely small and is determined primarily by the quality of the transmitting optical system.

Reflected light from the spot imaged on object 11 passes through the receiving objective lens 18 which causes the beam to converge. The converging received beam is then directed through nutating plate 20. In passing nutating plate 20, the converging light beam is displaced from the optical axis. Since nutating plate 20 is rotated with chopper 14, the converging light beam traces a circular path about the nominal optical axis. The nutated light beam is then directed toward receiving reticle 23 by way of reflecting members 21 and 22. By virtue of the geometric configuration of the receiving reticle 23, the converging beam is periodically interrupted so that it passes through optical filter 24 to detector 19 only four times per revolution of nutating plate 20. Optical filter 24 serves to transmit only those wavelengths near the operating wavelength of light source 10, thereby reducing the optical "noise" to detector 19.

In order to more fully understand the operation of the embodiment of FIG. 1, reference is made to the cross-sectional view of FIG. 3 which is taken through the center of composite lens-reticle structure 15. In FIG. 3, transmitting reticle 17 is indicated as a cross which masks most of transmitting objective lens 16 with the exception of the four substantially pie-shaped sections indicated as 16a, 16b, 16c, and 16d. The receiving objective lens 18, as indicated hereinabove, is disposed coaxially within the center of the transmitting objective lens and is held in place by suitable mounting or bonding means well-known in the art. Although the composite lens-reticle structure 15 is indicated as comprising two separate lenses, it is obvious that one single lens can be used together with an appropriate reticle which leaves a circular opening in the central region to form the receiving objective lens.

In either event, the two objective lenses 16 and 18 are positioned so that their focal planes coincide as indicated in FIG. 1. As will become more apparent from the description that follows, it is desirable that the depth of field of the transmitting optical section, including transmitting objective lens 16, be narrower than the depth of field of receiving objective lens 18. This requirement is met by the coaxial arrangement of lenses utilized in the present embodiment since the diameter of the transmitting objective lens is greater than that of the receiving objective lens, whereas the focal lengths of both are the same.

The composite chopper-nutating plate structure mentioned above is shown in greater detail in the front elevation view of FIG. 2. This structure comprises a mounting ring 30 in which the semicircular, opaque chopper member 14 is mounted. Coaxially disposed within the center of mounting ring 30 and mechanically fixed thereto is nutating plate 20. As indicated hereinabove, the composite chopper-nutating plate combination need not take on the geometric configuration of the illustrative embodiment. It is merely necessary that the rotation of chopper 14 and nutating plate 20 be synchronized. In FIG. 2, as in FIG. 1, the driving means for rotating the composite chopper-nutating plate is not shown. The driving means, however, can comprise a turbine-like air or fluid bearing assembly or any other suitable low-torque motor known in the art.

Returning to the operation of the embodiment of FIG. 1, as the hollow cone of light from ring-forming member 13 is intercepted by chopper 14, progressive segments of the transmitting lens-reticle structure 15 are illuminated. For the position shown, for example, segments 16a and 16d are illuminated, while segments 16b and 16c are blacked out. If the rotation of chopper 14 is arbitrarily selected as clockwise as shown, segments 16a and 16b would be the next to be illuminated, and so on.

FIG. 4 is an illustration of the receiving reticle 23, viewed from the direction of the optical axis indicated by arrows 4—4. Receiving reticle 23 comprises four opaque quadrants, 23a, 23b, 23c and 23d, which are held in place by a suitable mounting ring 40. Between the quadrants there is a transparent dielectric gap or air space in the form of a cross. Receiving reticle 23, therefore, has a geometric configuration which can be described as the inverse of the configuration of transmitting reticle 17; that is, the transparent region of the receiving reticle forms a cross, whereas in the transmitting reticle, the opaque region forms a cross.

Continuing the description of the operation of the embodiment of FIG. 1, reference is now made to FIGS. 5, 6, and 7, which represents the conditions of the embodiments of FIG. 1, wherein the illuminated region of object 11 is coincident with the focal plane, slightly beyond the focal plane, and slightly in front of the focal plane, respectively. Specifically, FIG. 5A is an enlarged view of a portion of object 11 showing the converging transmitted light indicated by arrows 50 illuminating a region of object 11 which lies in the focal plane. The image thus produced is shown in the partial view of object 11 illustrated by FIG. 5B. Under the condition of object-focal plane coincidence, the image formed is a highly illuminated point of light 51.

The reflected light from the illuminated point 51 is transmitted back through the receiving objective lens 18, as explained hereinabove. The reflected image is thereafter nutated in a circular path around the axis of receiving reticle 23 as indicated in FIG. 5C. The speed of rotation of the nutated reflected image is, of course, determined by the rotational speed of nutating plate 20. In each traversal of its circular path around receiving reticle 23, the reflected image passes through the transparent portions thereof and reaches detector 19. The reflected light beam thus passes through receiving reticle 23 four times during each revolution. Thus, the detector output signal shown graphically in FIG. 5D consists of a series of pulses having a frequency equal to four times the nutating frequency. The reference marks indicated along the abscissa of FIG. 5D, as well as FIGS. 6D and 7D, represent the reference points of zero phase. These marks correspond to the maxima of the detector output pulses for the object-focal plane coincidence condition illustrated in FIG. 5A.

FIGS. 6A, 6B, 6C and 6D illustrate the same sequence as described above but for the case in which the object 11 is slightly behind the focal plane. As seen from FIGS. 6A and 6B, the image produced on the object is larger and consists of two quadrants of light 61a and 61b produced by the masking effect of chopper 14 and transmitting reticle 17. After the received image is nutated about receiving reticle 23 shown in FIG. 6C it is transmitted to the detector. The detector output illustrated in FIG. 6D comprises a broadened waveform which is phase lagging with respect to the reference points of zero phase mentioned in the preceding paragraph. The fact that the detector output is phase lagging is interpreted by the phase comparator circuit 25 to mean that the object is located behind the focal plane of the transmitting optical system. The amount of phase lag as compared to the zero reference is representative of the distance which separates the focal plane and the object surface.

The sequence views of FIGS. 7A, 7B, 7C and 7D illustrates the conditions for an object positioned so that its surface is slightly in front of the focal plane. The illuminated region of object 11 is indicated again by light quadrants 71a and 71b. It is seen in FIG. 7B, however, that the position of the illuminated quadrants with respect to those of FIG. 6B is reversed. The detected output shown in FIG. 7D is thus phase leading. Again, phase comparator circuit 25 interprets this output information to mean that the object surface is in front of the focal plane by an amount related to the degree of phase lead.

From the foregoing it is seen that the output of phase comparator circuit 25 provides a precise measure of the position of the object surface with respect to the focal plane of the optical system of FIG. 1 over a limited range. This range can vary from less than one inch, to many inches, depending upon the optical characteristics of the lenses employed. The measuring range can be further extended by integrating the components of FIG. 1 into a unitary structure hereinafter referred to as the "sensing head" and adapting it for three-dimensional motion.

Figure 8:
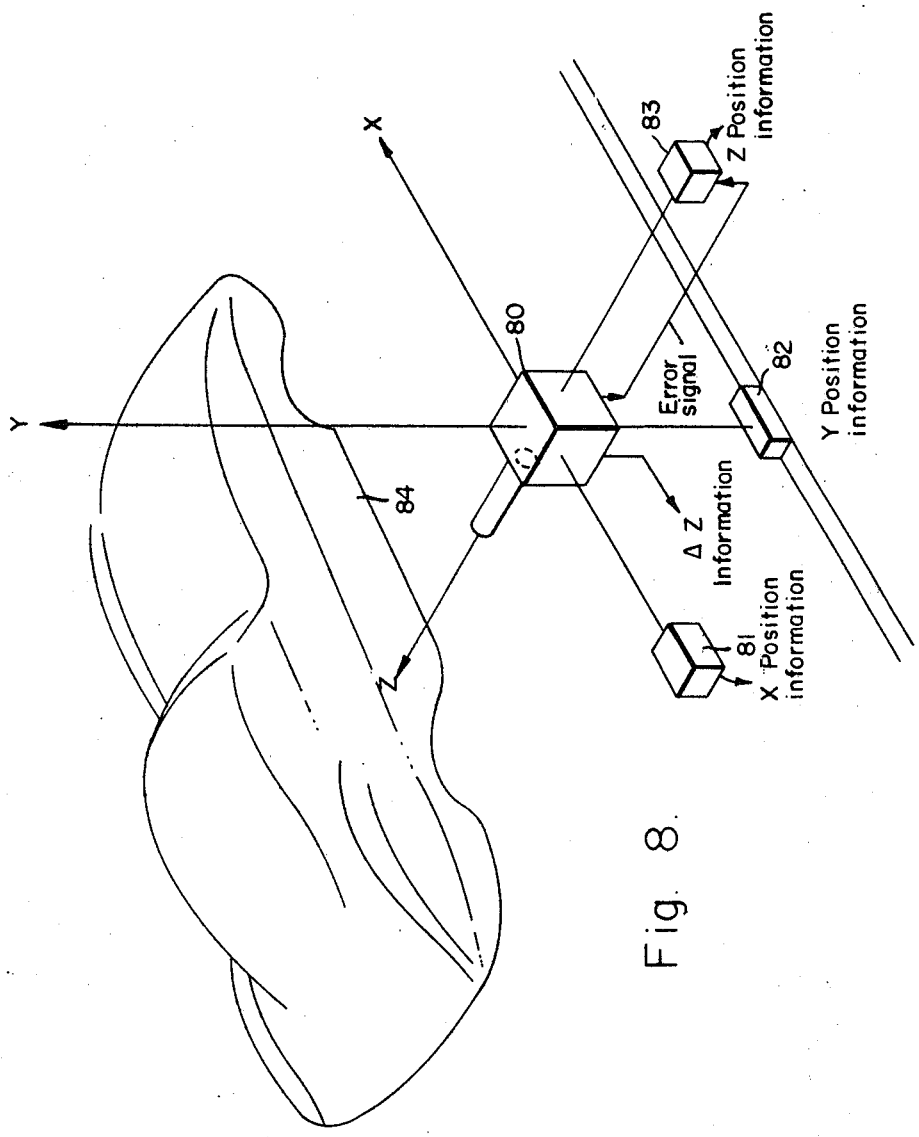
FIG. 8 is a simplified block diagram of an embodiment of the present invention adapted for contour mapping operation.

In applicant's above-cited copending application, Ser. No. 616,996, filed Jan. 3, 1967, now U.S. Pat. No. 3,481,672 issued Dec. 2, 1969 there is described a gantry for providing xyz motion of the sensing head for contour mapping applications. This arrangement is shown in the simplified block diagram of FIG. 8. In FIG. 8 the sensing head, which comprises the elements shown in the embodiment of FIG. 1, is indicated generally by block 80. The sensing head 80 is adapted by mechanical means for selective and controlled three-dimensional motion. Drive mechanisms indicated by blocks 81, 82 and 83 provide the power means for moving the sensing head in the x, y and z directions, respectively. In accordance with the arbitrarily assigned nomenclature of FIG. 8, the x and y axes correspond to the horizontal and vertical directions respectively, and the z axis corresponds to the direction perpendicular to the x–y plane toward the object 84.

In FIG. 8, object 84 is shown as comprising a model of an automobile body, the contour of which is to be measured. It is obvious, of course, that other models, such as buildings, airframes or other objects or products of substantially limitless scope may be adapted for contour mapping by this method.

For the sake of clarity, the mechanical details of the xyz drive mechanisms have been omitted from the embodiment of FIG. 8. Numerous suitable x–y plotters or gantrys are known in the art. Mechanical x–y plotters can comprise, for example, a set of horizontal load-bearing tracks which supports a framework, which, in turn, supports the drive motors, drive screws and linear displacement transducers. Control voltages to the drive motors can be programmed to cause the sensing head 80 to scan in the x–y plane. The x–y scanning can be done continuously or in incremental steps. Moreover, if either the x or y motion is performed in incremental steps, the distance between steps can be selected to correspond to the contour resolution desired. In either event, linear displacement transducers coupled to or integral with each of the drive mechanisms provide the readout which is indicative of the position of the sensing head along the x and y axes.

The displacement information from the x, y and z axes, linear displacement transducers, plus the Δz information from sensing head 80, is then coupled to a utilization means which, for example, can comprise storage means for storing the information on graphs, tapes or cards for later use. Alternatively, the utilization means can comprise the input of an automatic machine tool as indicated hereinabove.

In the partial pictorial views of FIGS. 9 and 10, there is shown a portion of the embodiment of FIG. 1 which includes a rotating plane-parallel plate 90 for use in the present invention. In FIG. 9 plane-parallel plate 90, which is disposed in the optical path between the composite transmitting lens-reticle structure, not shown, and object 11, is oriented so that its parallel surfaces are normal to the optical axis. In this position the converging light rays 91 pass through to object 11 without deviation to illuminate object 11 at point 51.

The pictorial view of FIG. 10 is identical to that of FIG. 9 except that plane-parallel plate 90 has been rotated through an angle of approximately 45 degrees with respect to the normal position. In this position the converging light rays passing through plate 90 are displaced from the optical axis as indicated by arrows 91'. These light rays emerge to illuminate object 11 at point 51'.

Thus, as plane-parallel plate 90 is rotated, the point of illumination moves across the surface of object 11 in a somewhat sawtooth fashion. The linear extent of the region scanned, which is twice the deviation d from the nominal optical axis, depends upon several factors. For example, the thickness and index of refraction of plane-parallel plate 90 and the transmitting lens focal length characteristics can all be varied to achieve the desired scan capability. However, since the light rays 91 are converging and not paraxial it is desirable to limit the scan of the rotating plane-parallel plate arrangement. This is due to the fact that the focal point of the converging light rays are shifted out of the nominal focal plane shown in FIGS. 9 and 10 as plate 90 is rotated. For a scan which is relatively small this shift can be compensated for since the error thus introduced is both small and predictable. The scan can be readily limited to predetermined rotational positions of plate 90 which lie between, for example, ±45 degrees from the nominal position shown in FIG. 9.

Blanking signals generated as plane-parallel plate 90 rotates past these predetermined positions can be utilized to deactivate the signal processing equipment associated with the utilization means during those portions of the rotational period in which scan is undesirable. The scanning region and blanking region for a typical rotating plane-parallel plate arrangement is shown in FIG. 10.

In practice, plane-parallel plate 90 is mounted in a suitable mounting ring and adapted for rotation about an axis which is perpendicular to the optical axis. Using the nomenclature of FIG. 8, if x-direction scanning is desired the axis of rotation of plate 90 is parallel to the y-direction and vice versa. It is obvious, of course, that rotating plate scanning combination of FIGS. 9 and 10 is supplementary to but not necessary to the operation of the present invention. It is possible that applications can arise in which the rotating plane-parallel plate scanner is either unnecessary or undesirable, in which case it may be omitted.

In all cases it is understood that the above-described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the invention.

What is claimed is:

1. A noncontacting gauge for determining the distance between a reference plane and an object comprising, in combination:
    means for generating a beam of high-intensity light;
    means for splitting said beam into a plurality of secondary beams;
    means for sequentially interrupting said secondary beams;
    means for concentrating the uninterrupted secondary beams on the surface of said object, said concentrating means having a predetermined focal point, the images of said uninterrupted secondary beams on said surface being substantially coincident when said focal point and said surface are coincident and separate when said focal point and said surface are not coincident;
    means for directing the reflected light from said images to an optical detector; and
    nutating means and reticle means disposed in the light path between said object and said detector; said nutating means serving to sweep the reflected image over said reticle means in synchronism with said sequential interrupting means to produce a pulsed output signal from said detector, the phase of said output pulses being indicative of the relative distance between said focal point and said surface.

2. The gauge according to claim 1 wherein said high-intensity light source comprises a continuous wave laser.

3. The gauge according to claim 1 wherein said sequential interrupting means comprises a rotating chopper.

4. The gauge according to claim 1 including servo means mechanically coupled to said beam generating means and responsive to changes in the phase of said output pulses for varying the distance between said beam concentrating means and said object to affect said coincident condition.

5. The gauge according to claim 1 including means for periodically sweeping said images across a region of said surface.

6. The gauge according to claim 5 wherein said sweep means comprises a rotating plane-parallel plate of refractive material interposed in the path of said uninterrupted secondary beams.

7. A method for determining the distance between a reference point and an object comprising the ordered steps of:
  generating a beam of high-intensity light;
  splitting said beam into a plurality of spatially separated secondary beams;
  sequentially interrupting said secondary beams;
  concentrating the uninterrupted secondary beams on the surface of said object, the images of said uninterrupted secondary beams on said surface being substantially coincident when said surface is in focus, and separate when said surface is out of focus;
  nutating the light reflected from said images over a receiving reticle in synchronism with the interruption of said secondary beams;
  directing the nutated light beams passing through said reticle to an optical detector, the output of said optical detector having a pulsed waveform;
  measuring the phase of said detector output pulses, the phase of said pulses with respect to a fixed reference phase being indicative of the distance by which said surface is out of focus.

8. The method according to claim 7 including the additional step of transmitting said concentrated uninterrupted secondary beams through a rotating plane-parallel plate of refractive material to periodically vary the position of said images on said surface.

9. A contour mapping device of the type having a sensing head which includes means for generating a beam of high-intensity light, means for splitting said beam into a plurality of secondary beams, means for concentrating said secondary beams on a surface of an object, the contours of which are to be mapped, and optical detector means for producing an output signal in response to the light reflected from said object; means for selectively moving said sensing head in a plane substantially normal to the axis of said light beams, servo means mechanically coupled to said sensing head, said servo means being capable of moving said sensing head in said axial direction in response to predetermined gross changes of said output signal, readout means coupled to said servo means, the output of said readout means being indicative of gross changes in the contours of said object, said device being characterized by a sensing head which includes:
  means for sequentially interrupting said secondary beams, a receiving reticle disposed in the light path in front of said optical detector, means for nutating the light reflected from said object about said receiving reticle in synchronism with said sequential interrupting means to produce a pulsed output waveform from said detector, means for comparing the phase of said output pulses with a reference phase to obtain an indication of fine changes in the contours of said object.

10. The contour mapping device according to claim 9 wherein said sensing head is further characterized by a rotating plane-parallel plate of refractive material interposed in the path of said concentrated secondary beams.

References Cited

UNITED STATES PATENTS 3,393,600   7/1968   Bess _____ 356—5

RONALD L. WIBERT, Primary Examiner

T. R. MOHR, Assistant Examiner

U.S. Cl. X.R.

356—167